US010178291B2

(12) United States Patent
Wexler et al.

(10) Patent No.: US 10,178,291 B2
(45) Date of Patent: Jan. 8, 2019

(54) OBTAINING INFORMATION FROM AN ENVIRONMENT OF A USER OF A WEARABLE CAMERA SYSTEM

(71) Applicant: OrCam Technologies, Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

(*) Notice: Subject to any disclaimer, the term of this patent is extended or adjusted under 35 U.S.C. 154(b) by 53 days.

(21) Appl. No.: 14/807,043

(22) Filed: Jul. 23, 2015

(65) Prior Publication Data
US 2016/0026871 A1 Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
*G06K 9/00* (2006.01)
*H04N 5/225* (2006.01)
(Continued)

(52) U.S. Cl.
CPC .......... *H04N 5/2259* (2013.01); *G01S 3/7864* (2013.01); *G02B 27/0093* (2013.01);
(Continued)

(58) Field of Classification Search
CPC .............. G02B 27/0093; G02B 27/017; G02B 2027/014; G02B 2027/0178;
(Continued)

(56) References Cited

U.S. PATENT DOCUMENTS

2012/0158482 A1* 6/2012 Paradise ............ G06Q 30/0224
  705/14.25
2013/0085802 A1* 4/2013 Belady .................. G06Q 90/00
  705/7.29
(Continued)

OTHER PUBLICATIONS

Wikipedia, Google Glass, https://web.archive.org/web/20130704143620/https://en.wikipedia.org/wiki/Google_Glass (Jul. 4, 2013).*
(Continued)

*Primary Examiner* — Andrew M Moyer
(74) *Attorney, Agent, or Firm* — Finnegan, Henderson, Farabow, Garrett & Dunner, LLP

(57) ABSTRACT

A wearable apparatus and method are provided for executing actions based on triggers identified in an environment of a user. In one implementation, a wearable apparatus for storing information related to objects identified in an environment of a user is provided. The wearable apparatus includes a wearable image sensor configured to capture a plurality of images from the environment of the user and at least one processing device. The processing device may be programmed to process the plurality of images to detect an object entering a receptacle, process at least one of the plurality of images that includes the object to determine at least a type of the object, and based on the type of the object, generate information related to an action to be taken related to the object.

12 Claims, 17 Drawing Sheets

(51) Int. Cl.
| | |
|---|---|
| *G06F 1/18* | (2006.01) |
| *G02B 27/00* | (2006.01) |
| *G02B 27/01* | (2006.01) |
| *G06F 3/01* | (2006.01) |
| *G06Q 30/02* | (2012.01) |
| *H04N 5/232* | (2006.01) |
| *H04N 7/18* | (2006.01) |
| *G06F 1/16* | (2006.01) |
| *G06F 3/00* | (2006.01) |
| *G06F 3/038* | (2013.01) |
| *H04N 5/235* | (2006.01) |
| *G06F 17/30* | (2006.01) |
| *G06T 7/20* | (2017.01) |
| *H04N 5/44* | (2011.01) |
| *G01S 3/786* | (2006.01) |
| *H04N 1/21* | (2006.01) |
| *G06K 9/62* | (2006.01) |
| *G06F 3/03* | (2006.01) |
| *G06T 7/00* | (2017.01) |
| *G06T 7/73* | (2017.01) |

(52) U.S. Cl.
CPC ........... *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 17/30277* (2013.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search
CPC .... G02B 2027/0187; G02B 2027/0138; G06F 1/1686; G06F 3/0304; G06F 17/30277; G06F 1/18; G06F 3/011; G06F 1/163; G06F 3/005; G06F 3/012; G06F 3/038; G06F 3/017; G06F 2203/011; H04N 5/23206; H04N 5/2259; H04N 5/2254; H04N 5/23258; H04N 5/2258; H04N 5/23219; H04N 5/2251; H04N 5/23245; H04N 5/2252; H04N 5/44; H04N 7/183; H04N 1/2112; H04N 5/23229; H04N 5/23216; H04N 7/185; G06T 7/0022; G06T 7/20; G06T 2207/10016; G06T 2207/10004; G06T 2207/30232; G06K 9/00677; G06K 9/00288; G06K 9/6262; G06K 9/00671; G06K 9/00718; G06K 9/00624; G06K 9/00335; G06K 9/00221; G06K 9/00201; G06K 9/00208; G06K 2209/21; G06K 2209/25; G06Q 30/0267; G06Q 30/0269; G06Q 30/0257; G06Q 30/0246; G01S 3/7864
USPC ........................................................ 382/103
See application file for complete search history.

(56) References Cited

U.S. PATENT DOCUMENTS

| | | | | |
|---|---|---|---|---|
| 2013/0185150 | A1* | 7/2013 | Crum | G06Q 30/02 705/14.49 |
| 2014/0156459 | A1* | 6/2014 | Zises | G06Q 30/0623 705/26.61 |
| 2014/0301598 | A1* | 10/2014 | Marty | G06T 7/2033 382/103 |

OTHER PUBLICATIONS

Wikipedia, GoPro, https://web.archive.org/web/20130611082527/ https://en.wikipedia.org/wiki/GoPro (Jun. 11, 2013).*

* cited by examiner

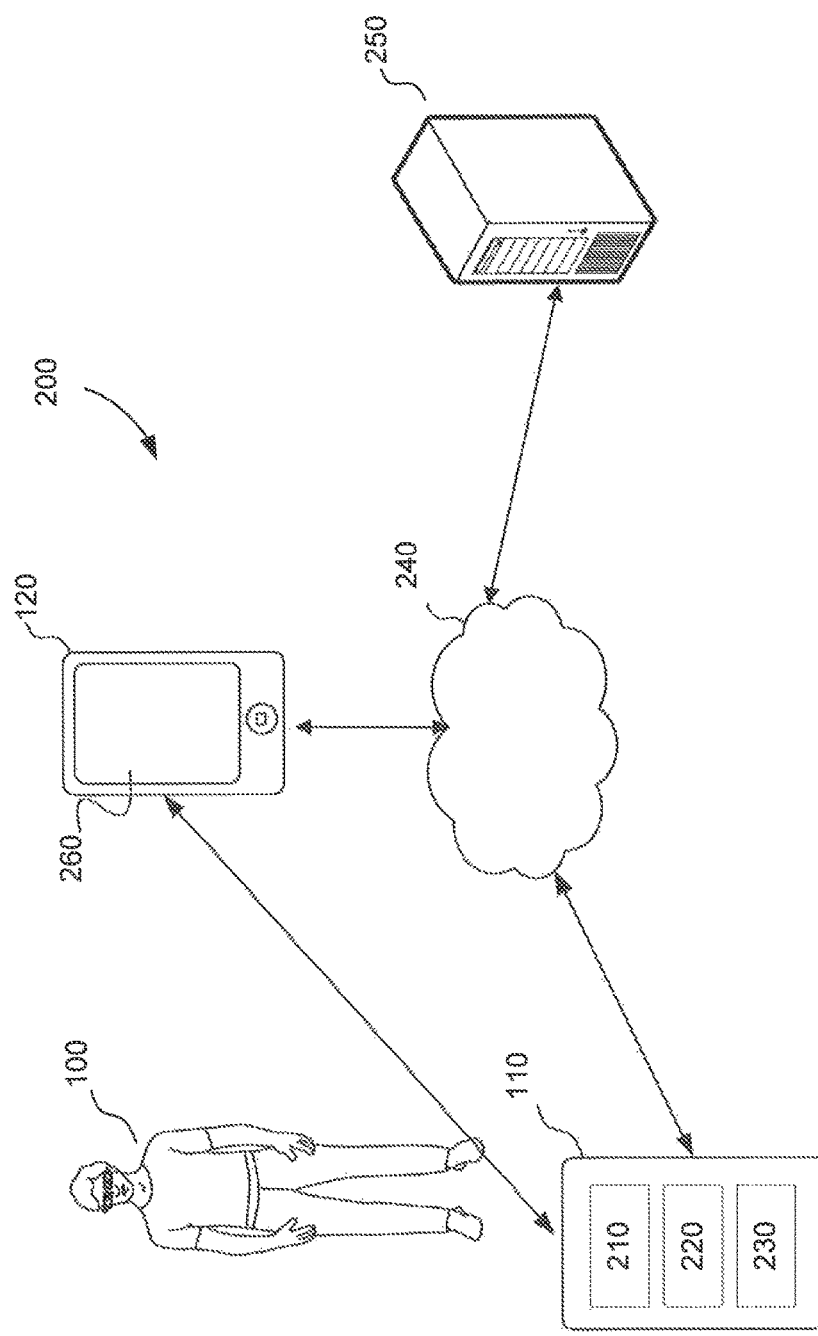

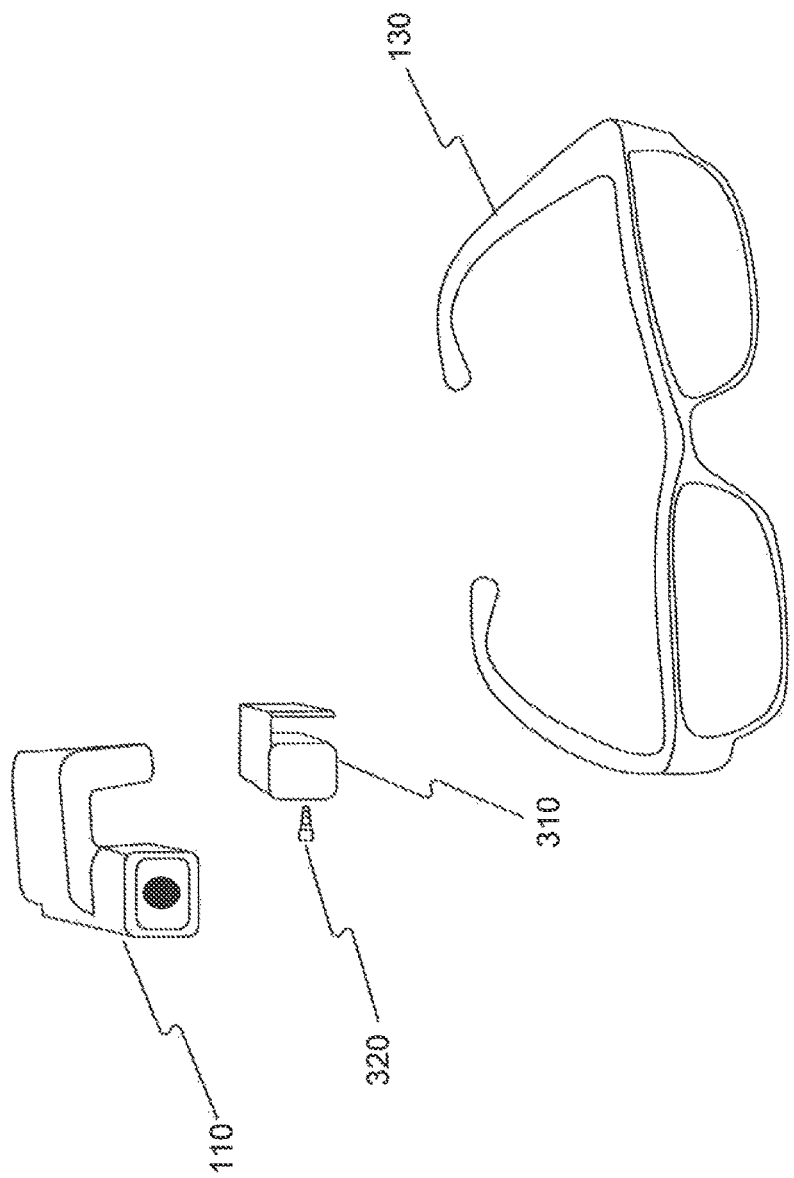

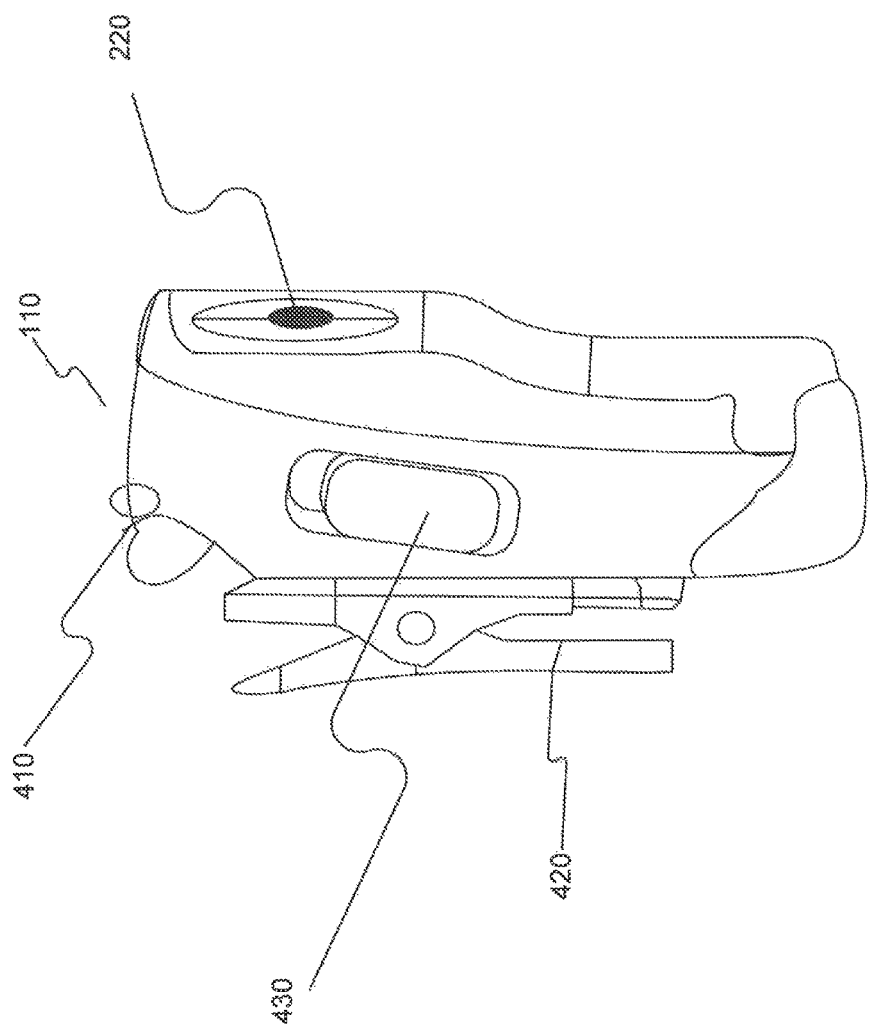

OBTAINING INFORMATION FROM AN ENVIRONMENT OF A USER OF A WEARABLE CAMERA SYSTEM

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

Technical Field

This disclosure generally relates to devices and methods for capturing and processing images from an environment of a user. More particularly, this disclosure relates to devices and methods for obtaining information from an environment of a user of a wearable camera system.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for automatically capturing and processing images from an environment of a user.

In accordance with a disclosed embodiment, a wearable apparatus for storing information related to objects identified in an environment of a user includes a wearable image sensor configured to capture a plurality of images from the environment of the user and at least one processing device. The processing device may be programmed to process the plurality of images to detect an object entering a receptacle, process at least one of the plurality of images that includes the object to determine at least a type of the object, and based on the type of the object, generate information related to an action to be taken related to the object.

In accordance with another embodiment, a method for storing information related to objects identified in an environment of a user of a wearable apparatus is provided. The method may include capturing a plurality of images from the environment of the user by a wearable image sensor, processing, via at least one processing device, the plurality of images to detect an object entering a receptacle, determining, via the at least one processing device, at least a type of the object from at least one of the plurality of images that includes the object, and generating, based on the type of the object, information related to an action to be taken related to the object.

In accordance with another embodiment, a non-transitory computer readable medium storing instructions executable by at least one processing device is provided. The instructions may include instructions for capturing a plurality of images from the environment of a user by a wearable image sensor, processing the plurality of images to detect an object entering a receptacle, determining at least a type of the object from at least one of the plurality of images that includes the object, and generating information related to an action to be taken related to the object Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of an example system consistent with the disclosed embodiments.

FIG. 3B is an exploded view of the example of the wearable apparatus shown in FIG. 3A.

FIG. 4B is a schematic illustration of the example of the wearable apparatus shown in FIG. 1B from a second viewpoint.

DETAILED DESCRIPTION

Figure 1A:
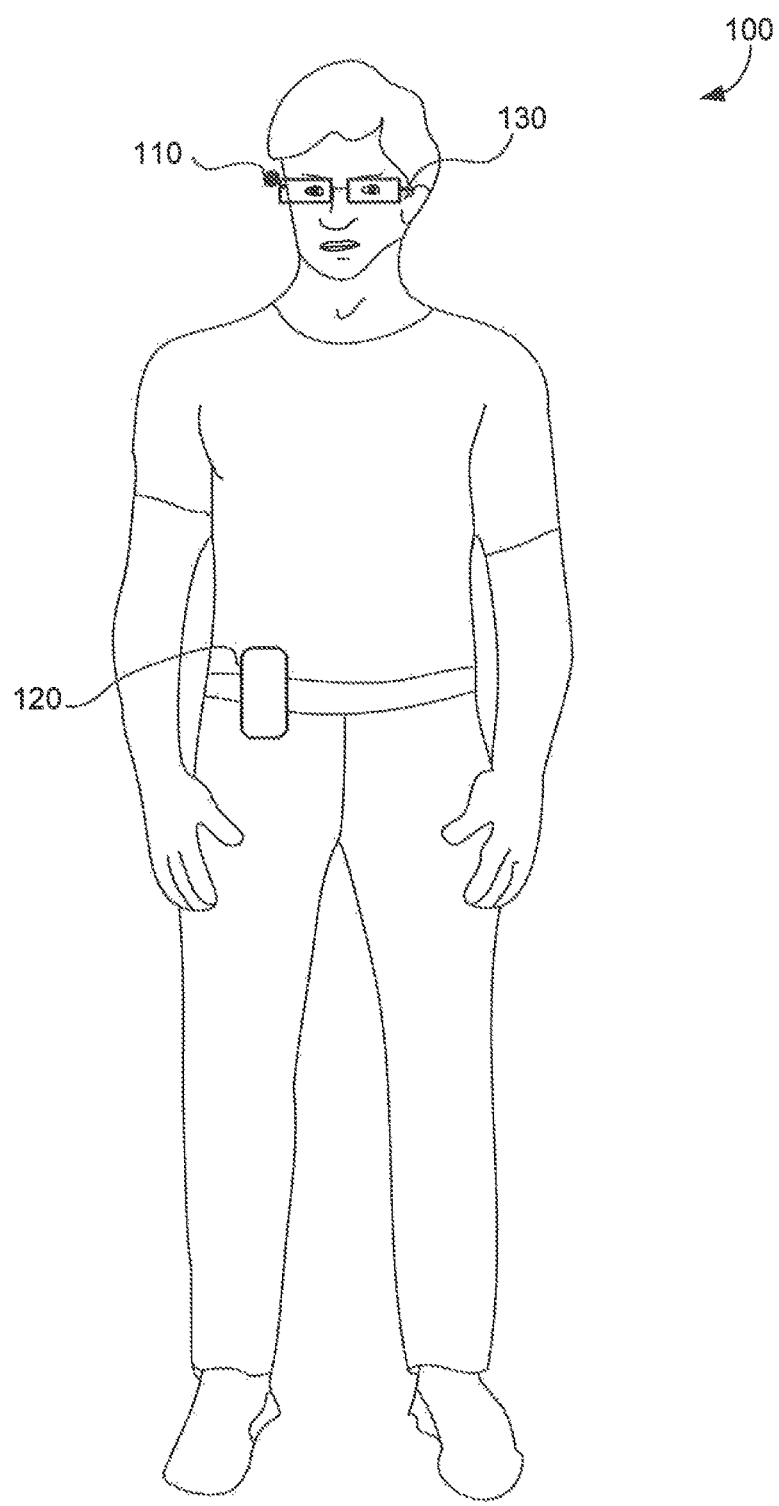
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
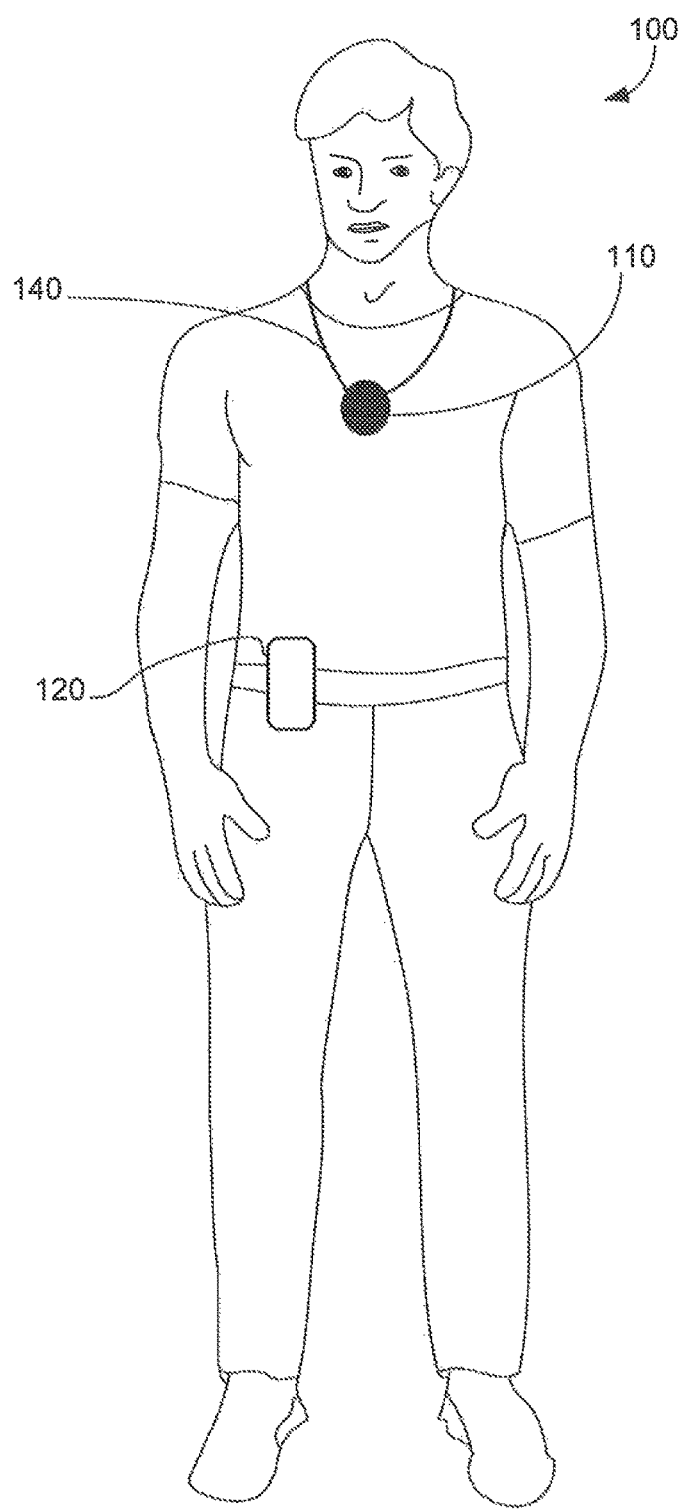
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
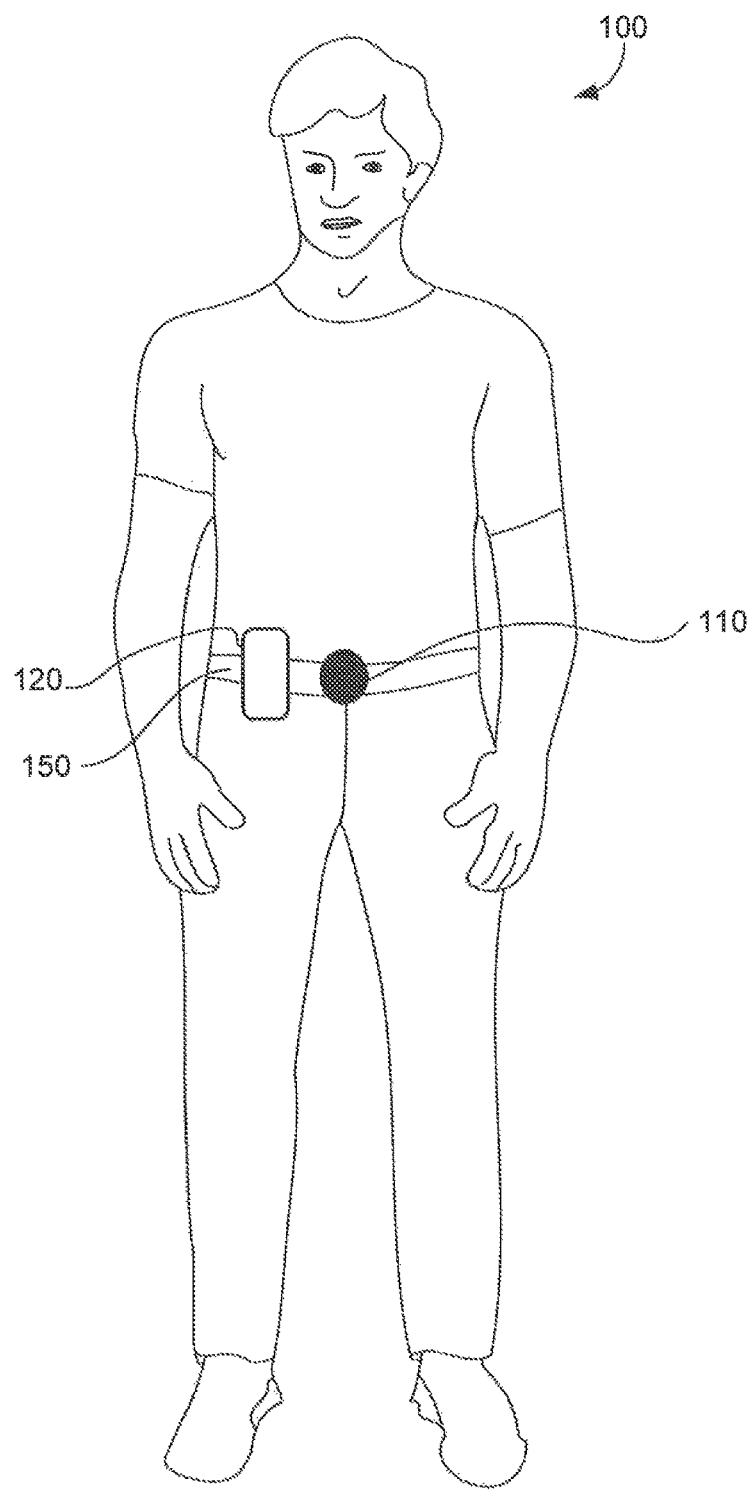
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
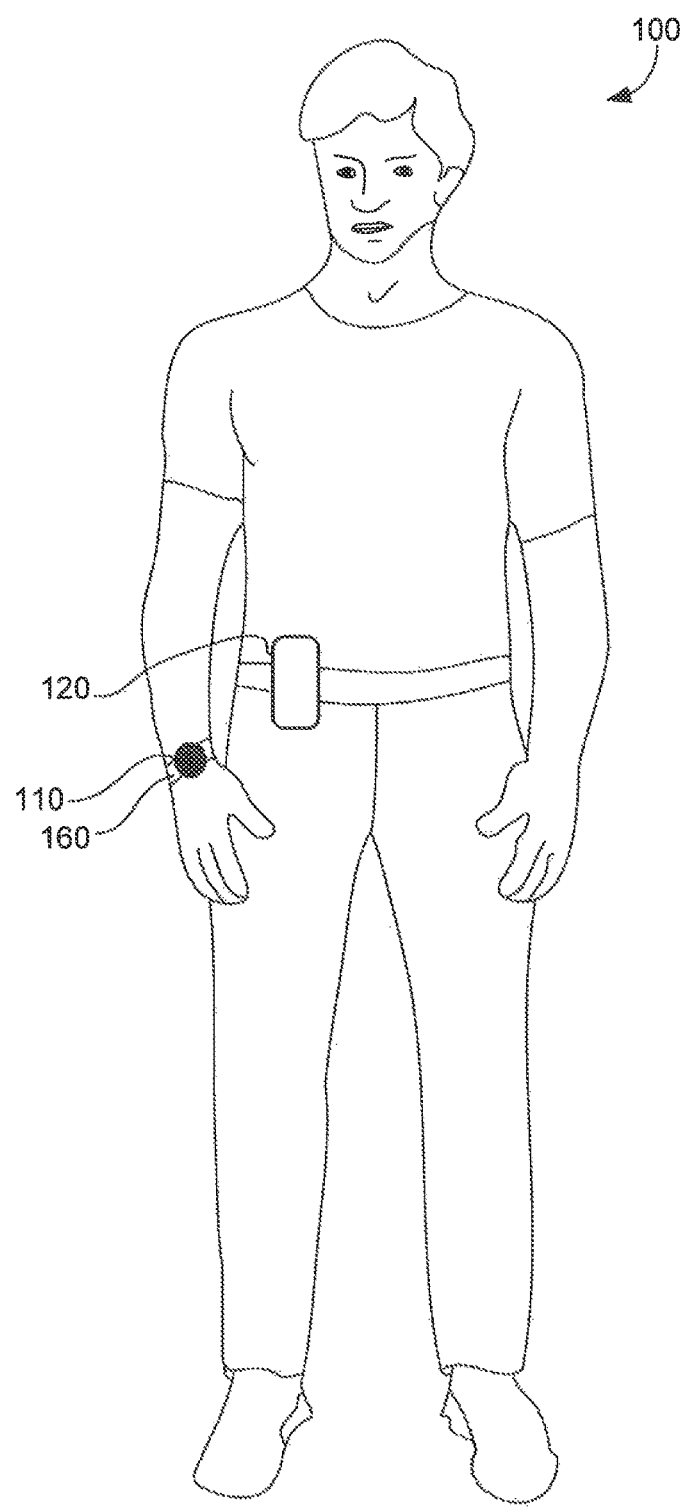
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
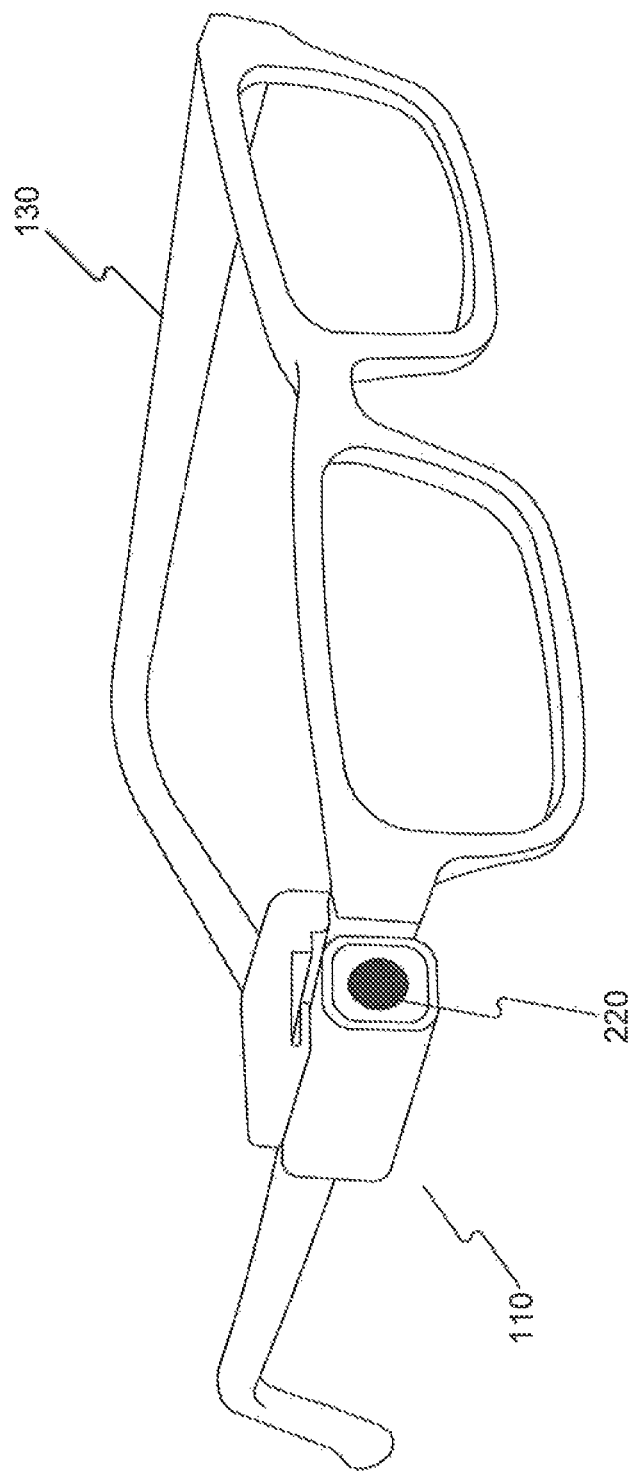
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
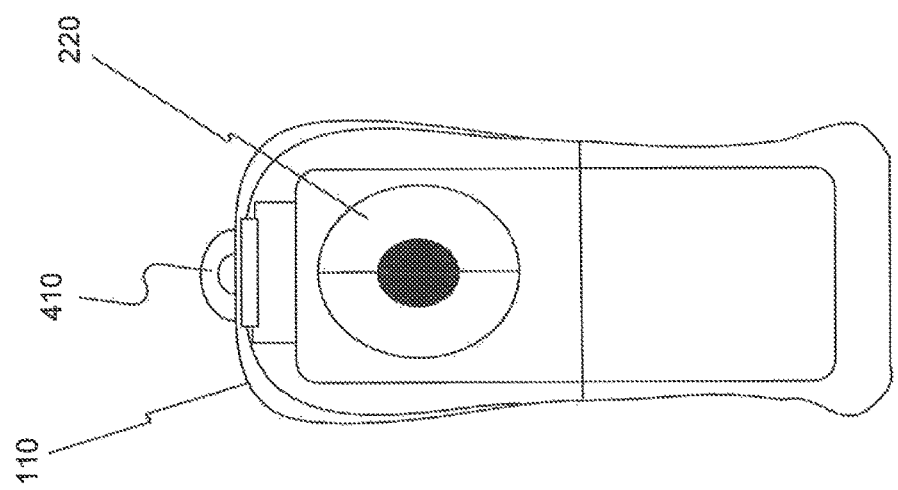
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
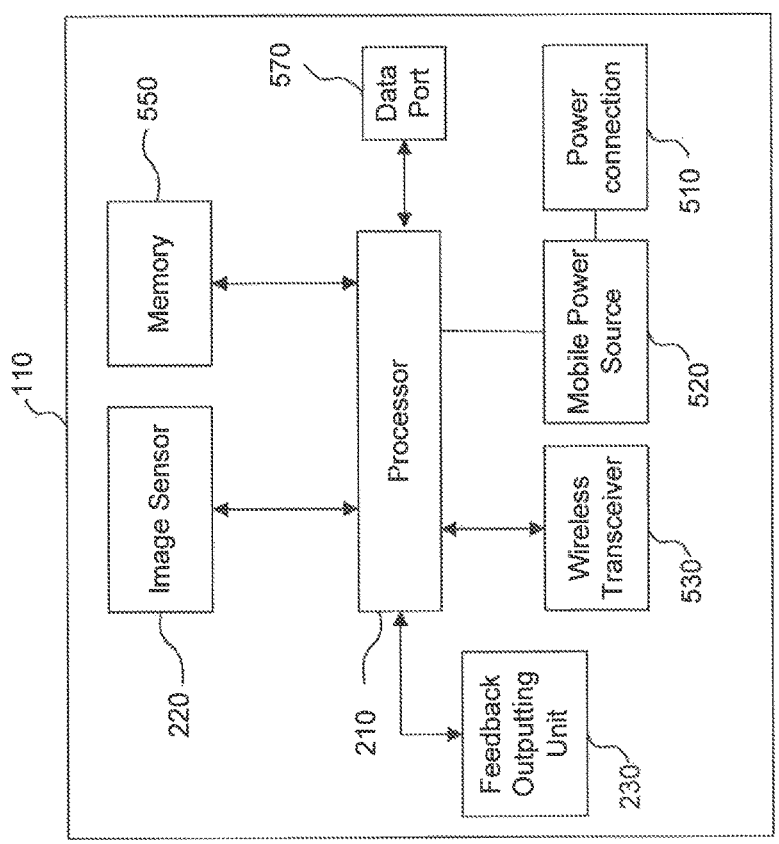
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 205. In other embodiments, wireless transceiver 530 may transmit data and instructions to an external feedback outputting unit 230.

Figure 5B:
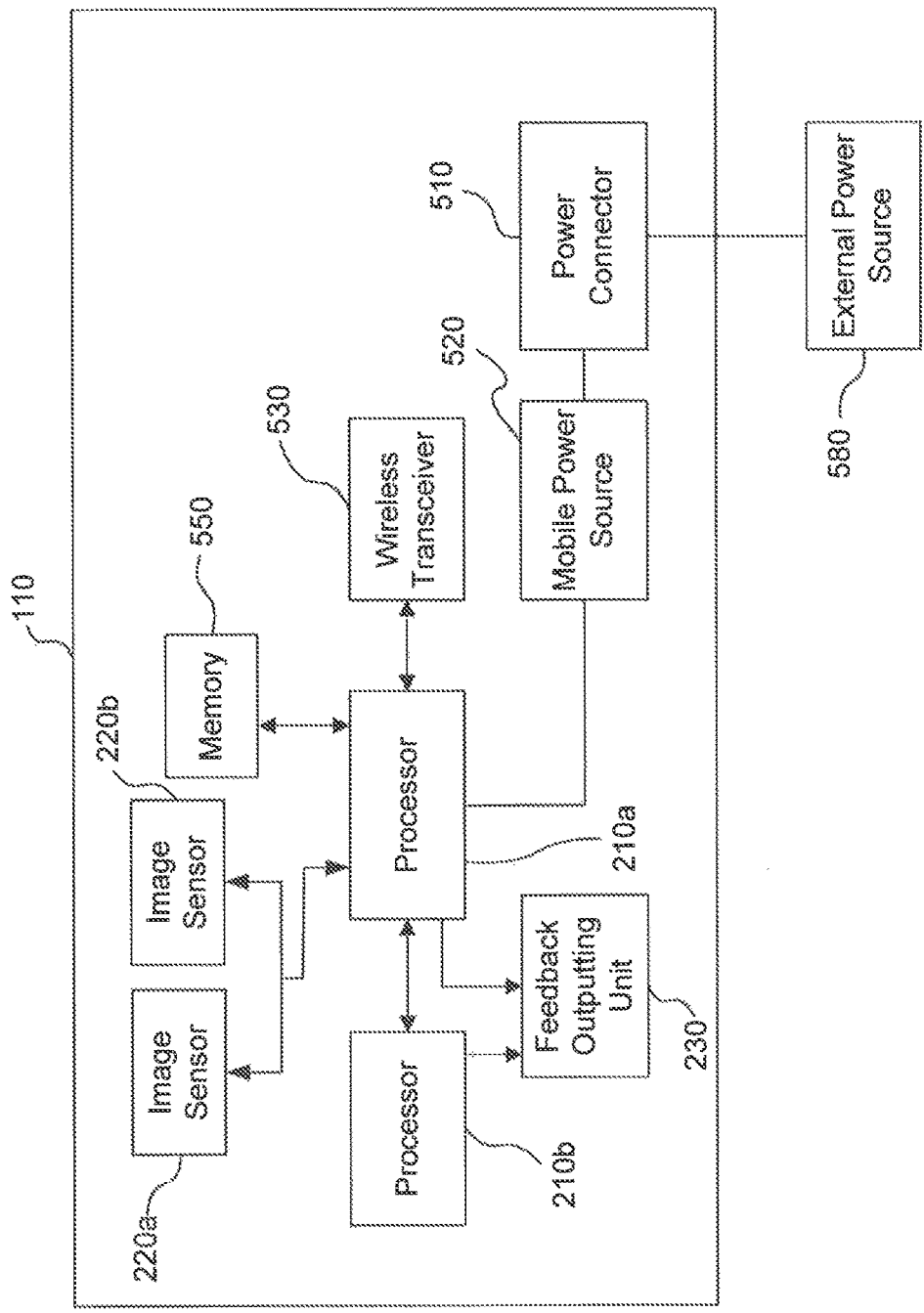
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
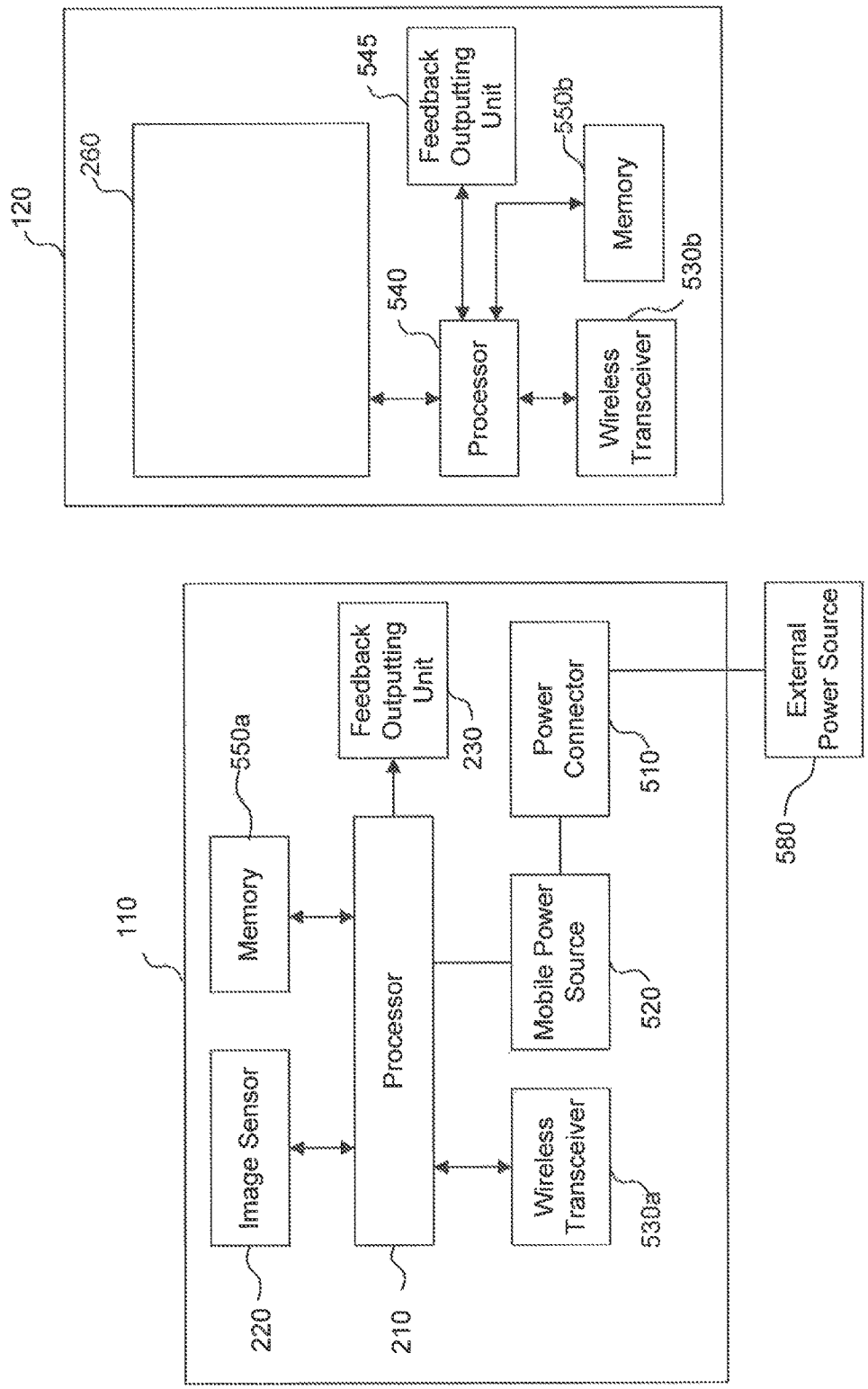
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger. Additional embodiments including acquiring information based on a trigger recognized in an environment of the user are described as follows.

Some embodiments of the present disclosure include acquiring environmental information or taking other actions based on trigger recognition. In some embodiments, triggers may include objects, actions, and contextual situations identified in image data acquired by wearable apparatus 110. Triggers may also be identified in audio data acquired by wearable apparatus 110. As discussed above, triggers may also include hand-related triggers. When a trigger is identified by a processing device associated with wearable apparatus 110, the processing device may initiate an action in response to the trigger. In some embodiments, an action in response to the trigger may include the acquisition and/or storage of environmental data, images, and/or audio. In some embodiments, an action in response to the trigger may include the execution of commands by a processing device in communication with wearable apparatus 110.

In an exemplary embodiment consistent with the present disclosure, wearable apparatus 110 may identify a trigger to update a shopping list. For example, a processing device associated with wearable apparatus 110 may identify an object entering a receptacle, such as a trash or recycling bin or a shopping cart. The associated processing device may then identify that the object is a specific product, and update a shopping list or provide a reminder based on the identification. For example, if wearable apparatus 110 captures images of a box of cereal being placed in a recycling bin, a processing device may create a reminder to buy cereal and/or update a shopping list by including cereal in the list. In a further example, if wearable apparatus 110 captures images of a box of cereal being placed in a shopping cart, the processing device may update a shopping list by removing cereal from the list.

In another exemplary embodiment consistent with the disclosure, wearable apparatus 110 may store audio and/or image data in response to an audio trigger. For example, at least one processing device may buffer audio received from a microphone associated with wearable apparatus 110. The buffered audio may be analyzed for triggers in the audio data. After identifying a trigger in the audio data, for example, the phrase "record," the processing device may cause the storage of data, either audio, image, or both, received before and after the audio trigger was received. A user may alter a predetermined length of time that data before and after the trigger is recorded, may use a second trigger to signal an end of a recording period, and/or may include a length of time for recording in the trigger itself, e.g. "record audio for thirty seconds."

In yet another exemplary embodiment consistent with the present disclosure, a trigger based on a context associated with a room in which a user is located may cause a processing device to transmit instructions to a remote device (e.g., a smartphone) to enter a silent mode. For example, if a user walks into a theater, the processing device may interpret that as a trigger and cause a remote device to switch to a silent mode.

Embodiments of the present disclosure may use various image recognition techniques, including, for example, object identification, facial recognition, and optical character recognition to identify triggers or other content within images. These techniques may be used singularly and in conjunction with one another.

Images to be recognized may initially be categorized by image type. For example, portions of images may be initially categorized as text, faces, objects, scenes, etc. Categorizations may assist wearable apparatus 110 in determining image recognition techniques to be used.

Object identification may be used to identify objects or items in an image portion. Object identification may include comparisons between image portions and database contents. Databases for comparisons may be locally stored, e.g., in a memory associated with wearable apparatus 110 and remotely stored, e.g., in a remote server configured for data storage and communication with wearable apparatus 110. Objects may be identified through, for example, categorization. An object in an image portion may be categorized based on comparisons with one or more images of representative objects in a database. Based on the comparisons, an object may be assigned a category, e.g., vehicle, tree, building, consumer product, etc. The object may then be further categorized based on comparisons with sub-categories within a first assigned category. Thus, the identity of an object may be narrowed down through multiple image comparisons. Objects may also be identified, for example, through other types of comparisons with images stored in a remote or local database.

Scene, or contextual situation, recognition may be performed based on the recognition of multiple objects within an image, and their relationship with one another. Object identification may be used to identify multiple objects within a scene via comparison with databases, and relationships between identified objects may be used to identify a scene. For example, the recognition of multiple chairs and a table may indicate a dining scene if the chairs are located around the table and dinnerware is identified in the image. The recognition of multiple chairs and a table may also indicate, for example, a press conference, if the chairs are aligned in rows facing the table.

Facial recognition may also be performed by apparatus 110 to identify portions of an image. Facial recognition techniques consistent with the present disclosure may be used to compare image content with images of faces stored in a database. Recognition of a particular individual's face within the database may constitute a trigger.

Optical character recognition may also be used for trigger identification. The term "optical character recognition" includes any method executable by a processor to retrieve machine-editable text from images of text, pictures, graphics, etc. Some OCR techniques and other document recognition technology use a pattern matching process to compare the parts of an image to sample characters on a pixel-by-pixel basis. This process, however, does not work well when encountering new fonts, and when the image is not sharp. Accordingly, apparatus 110 may use an OCR technique that compares a plurality of sets of image regions that are proximate to each other. Apparatus 110 may recognize characters in the image based on statistics related to the plurality of the sets of image regions. By using the statistics of the plurality of sets of image regions, apparatus 110 can recognize small font characters defined by more than four pixels e.g., six or more pixels. In addition, apparatus 110 may use several images from different perspectives to recognize text on a curved surface. In another embodiment, apparatus 110 can identify in image data an existence of printed information associated with a trigger stored in a database and execute the trigger command thereafter. Examples of a system command include: "enter training mode," "enter airplane mode," "backup content," "update operating system," etc.

Curved surface textual recognition may be particularly useful for identifying text on, for example, a consumer product. A curved surface may include any surface containing at least one bend, arc, round, or any other non-straight structure. For example, the outer surfaces of a bottle, a can, a tin, and a cathode ray tube (CRT) screen are all examples of a curved surface. For simplicity, an object having a curved surface is herein referred to as a curved object. Curved objects may include a food product (e.g., a food product with a can or a tin package), a beverage (e.g., a bottle or a can), a pharmaceutical drug (e.g., a drug with a drug bottle), etc., and text may include text on a label associated with curved object.

In some embodiments, layout analysis may be performed to assist with optical character recognition. Apparatus 110 may capture an image that includes text. After capturing the image, to save resources and to process portions of the text that are relevant to the user and may include triggers, apparatus 110 may initially perform a layout analysis on the text. The term "layout analysis" refers to any process of identifying regions in an image that includes text. For example, layout analysis may detect paragraphs, blocks, zones, logos, titles, captions, footnotes, etc.

Figure 6:
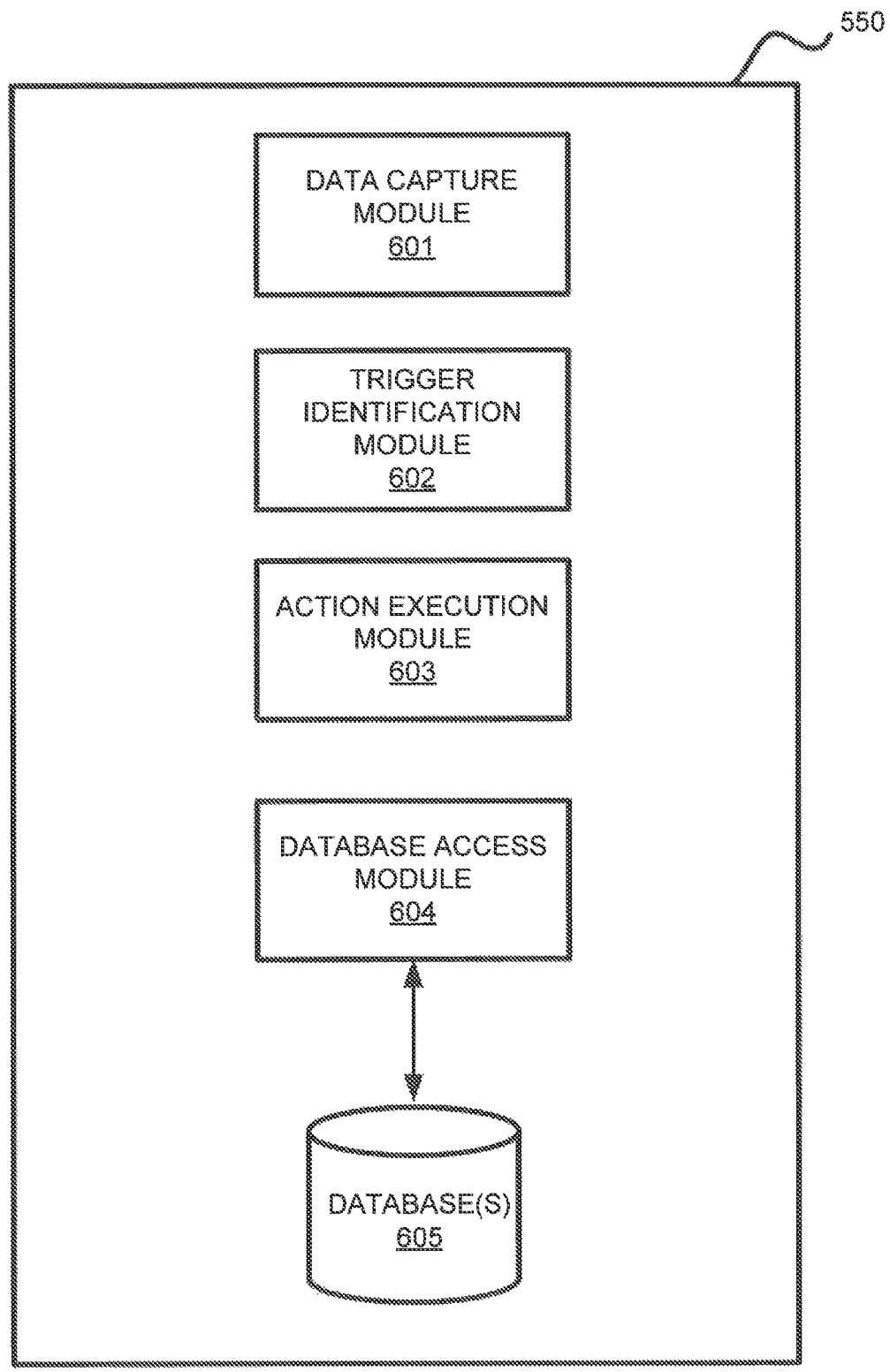
FIG. 6 illustrates an exemplary embodiment of a memory containing software modules consistent with the present disclosure.

FIG. 6 is a diagram illustrating an example of memory 550 storing a plurality of modules, consistent with the disclosed embodiments. The modules may be executable by at least one processing device to perform various methods and processes disclosed herein. Memory 550 may store more or fewer modules than those shown in FIG. 6.

As illustrated in FIG. 6, memory 550 may store software instructions to execute a data capture module 601, a trigger identification module 602, an action execution module 603, a database access module 604, and database(s) 605. Data capture module 601 may include software instructions for receiving data from wearable apparatus 110. Trigger identification module 602 may include software instructions for analyzing data obtained by wearable apparatus 110 to identify triggers in the data. Action execution module 603 may include software instructions to cause the occurrence of an action based on a trigger identified in acquired data. Database module 604 may include software instructions executable to interact with database or databases 605, to store and/or retrieve information.

Data capture module 601 may include software instructions for receiving data from a wearable apparatus, such as a wearable camera system. Data received from a wearable camera system may include audio and image data, captured, by, for example, an image sensor or microphone associated with the wearable camera system. Image data may include raw images and may include image data that has been processed. Raw images may be provided, for example, in the form of still images and video data. In some embodiments, image data and audio data may be preprocessed prior to capture by data capture module 601. Preprocessing may include, for example, noise reduction, artifact removal, compression, and other image preprocessing techniques.

Trigger identification module 602 may be configured to analyze data captured by data capture module 601 to detect or identify triggers. Image related triggers may include, for example, the detection of objects, contexts, situations, people, products, words, text, pictures, actions, and any other identifiable feature in an image or series of images. Triggers may be detected in still images or in video images. Triggers may also be detected based on the relationship of identifiable features with respect to one another in an image or video. For example, a person holding a specific product may constitute a trigger. A person approaching or departing may constitute a trigger. Audio related triggers may also include the detection of certain sounds, speech, and/or speech patterns in audio data. For example, a fire alarm may be a trigger, the pattern of a specific person's speech may be a trigger, a specific sequence of words may be a trigger. Some triggers may include combinations of audio, image, and hand-related triggers. For example, a specific image identified in conjunction with a specific sequence of words may be a trigger. Specific examples of triggers provided herein are exemplary only, and a person of skill in the art will recognize other triggers that remain consistent with the present disclosure.

Triggers consistent with the disclosed embodiments may also include images of pre-determined physical objects, individuals disposed within the captured image data, and text recognized within the captured image data. For example, apparatus 110 may be configured to perform one or more actions automatically upon detection of an image of an individual wearing a specific uniform (e.g., a firefighter, emergency medical technician (EMT), a police officer, a member of the military, or a flight attendant) within the captured image data. Trigger identification module 602 may use various image recognition techniques to identify triggers, such as those described herein and others known in the art.

Action execution module 603 may be configured to perform a specific action in response to a detected trigger. In some embodiments, actions may include the acquiring and storing data from an environment of a user. For example, a user may trigger a wearable apparatus to record data related to their environment by saying "record image and audio for 30 seconds." Actions may also include creating and updating task lists, such as shopping lists, reminder lists, and to-do lists. For example, data capture module 601 may capture an image of a car's gas tank gauge, trigger identification module 602 may analyze the image to determine that the car is low on fuel, and action execution module 603, in response, may create a task for the user to fill the car with fuel. In further embodiments, actions may adjust the settings of a device, such as a smartphone or tablet, controlled by a wearable camera system. For example, ambient noise may trigger a controlled device to increase volume.

Database access module 604 may be configured to access database(s) 605, for example, to retrieve or store images and/or audio data captured via data capture module 601. In some embodiments, database 605 may be configured to store trigger detection related information, such as images, audio, and/or video with which trigger identification module 602 may compare data for trigger detection. Database 605 may be configured to store any type of information of use to modules 601-604.

Figure 7:
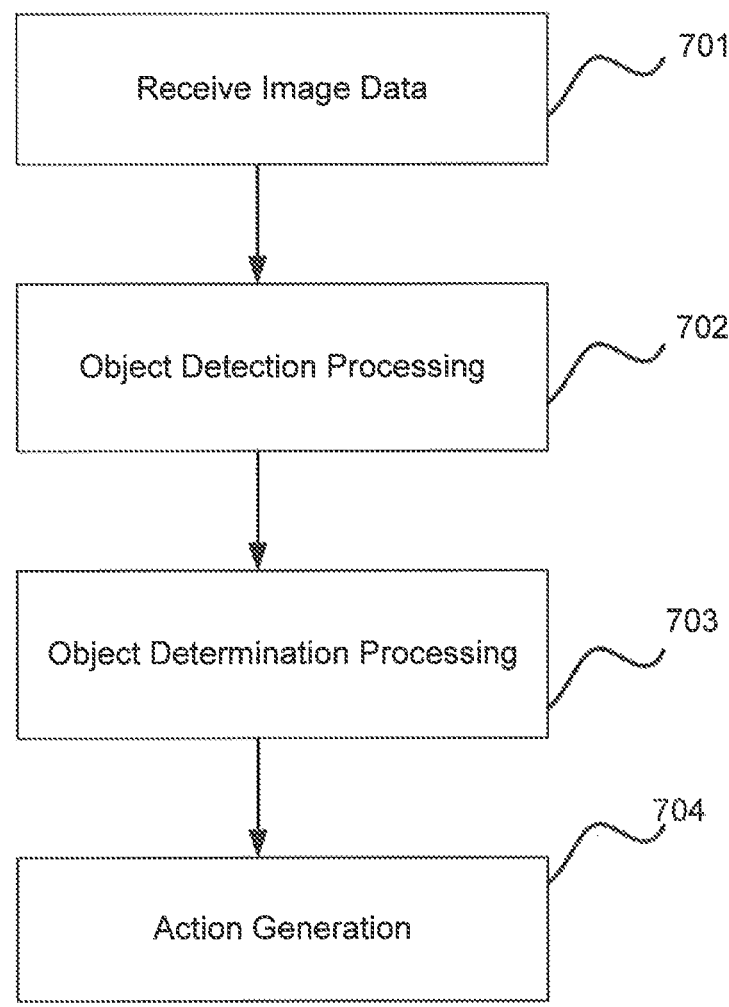
FIG. 7 is a flowchart illustrating an exemplary method consistent with the present disclosure.

FIG. 7 illustrates a flowchart of an exemplary method for updating shopping lists consistent with the present disclosure. Shopping list update method 700 may be carried out, for example, by a processing device integrated with and/or associated with wearable apparatus 110. In such an embodiment, wearable apparatus 110 may include a wearable image sensor, e.g. image sensor 220, configured to capture a plurality of images from the environment of the user. For exemplary purposes only, shopping list update method 700 is described herein with respect to processing device 210 cooperating with memory 550 to execute modules 601-604.

At data reception step 701, processing device 210 may receive image data captured by a wearable image sensor. Step 701 may be facilitated by software instructions of data capture module 601. Data capture module 601 may be configured to execute instructions to receive image data from a wearable image sensor, and may also be configured to execute instructions to control the wearable image sensor. Controlling the wearable image sensor may include issuing commands to record images and videos, and may also include issuing commands to control an orientation or direction of viewing of the image sensor.

Received image data may be processed via software steps executed by trigger identification module 602 during object detection step 702. Trigger identification module, as described above, may analyze image data to detect triggers within the images. In the embodiment of shopping list update method 700, triggers may include images or video of objects entering receptacles. Thus, trigger identification module 602 may process the plurality of images received from the wearable image sensor to detect an object entering a receptacle, such as a trash receptacle, a recycling receptacle, a shopping cart, and a shopping bag. The trigger identification module 602 may be further configured to process the plurality of images to detect the object leaving the hand of the user prior to entering the receptacle.

In addition to identifying that an object is being placed in a receptacle, the system may also determine what type of object is being placed in the receptacle by processing one or more images. Trigger identification module 602 may process at least one of the plurality of images that include the object to determine at least a type of the object, at step 703. The type of object may include, for example, at least one of a type of product, a brand of product, and a product name. A type of product may include, for example, shampoo or cereal. A brand of product may include, for example, a specific brand or manufacturer of a product, i.e., the manufacturer of the shampoo or cereal, and a product name may include, for example, the specific name of the manufacturer's shampoo or cereal. The identification of an object being placed in a receptacle may constitute an image related trigger.

After a type of object has been identified, action execution module 603 may perform an action in response to the image related trigger, at action generation step 704. Action execution module may generate information related to an action to be taken related to the object, based on the determination of the type of object. Information related to an action to be taken may include a reminder to purchase a replacement object, for example on a shopping list or task list. Such information may also include removing the object from a shopping list or task list, where, for example, the receptacle the object is placed in is a shopping cart or shopping bag.

In one example of a shopping list updating method, a wearable apparatus of a user may generate a reminder list or shopping list over the course of several days as the apparatus identifies one or several products that are thrown away or recycled by the user. As the user finishes a product (e.g., finishes a bottle of milk and recycles it, finishes a box of cereal and recycles it, etc.) the system may identify that the product has been consumed and generate a shopping list or reminder list including the item. When the user then enters a grocery store and purchases the item, the system may again identify the purchase as a trigger, and remove the item from the shopping list or reminder list.

Figure 8:
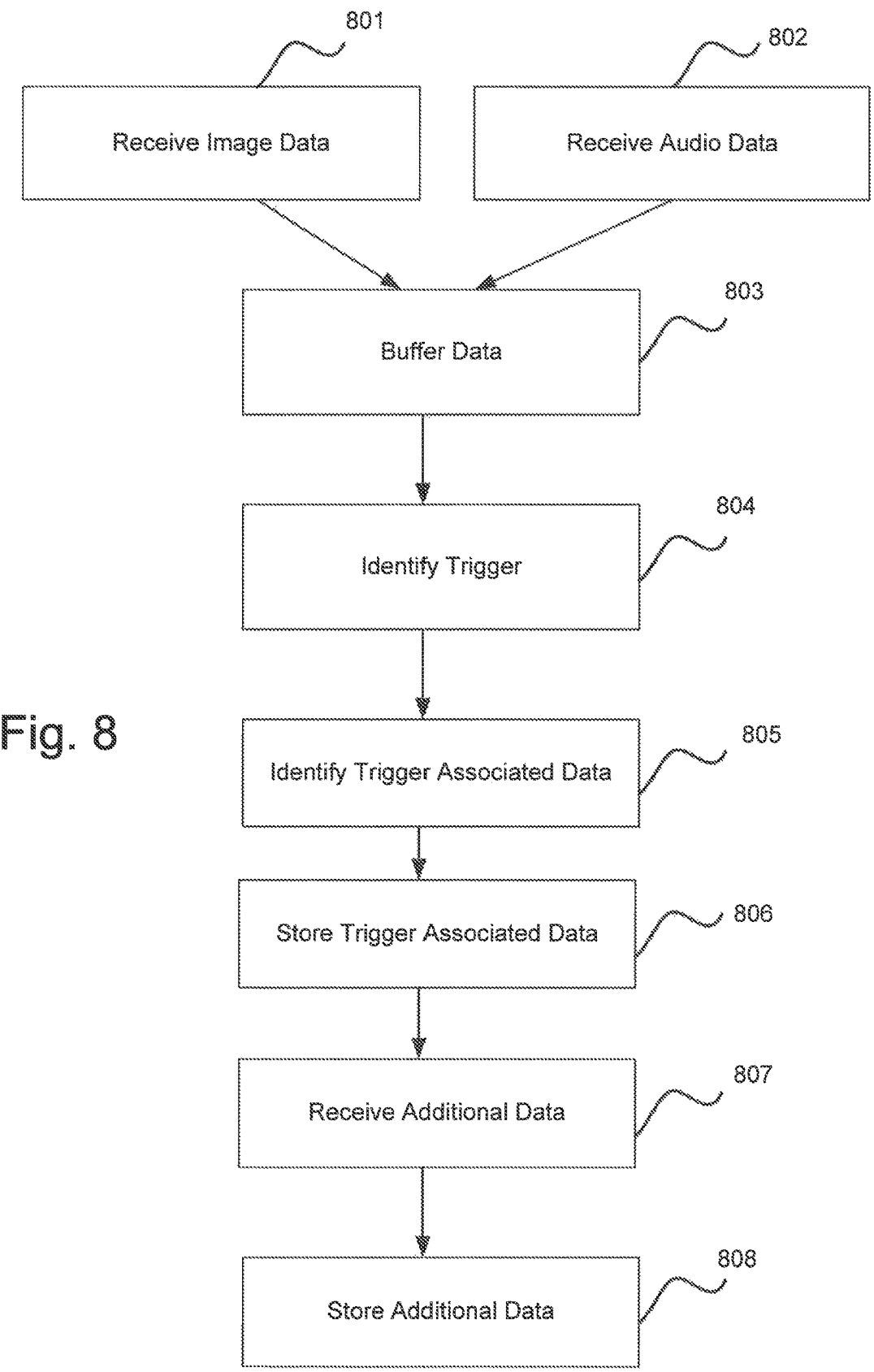
FIG. 8 illustrates a flowchart of an exemplary method for selectively storing data captured by a wearable apparatus.
Figure 9:
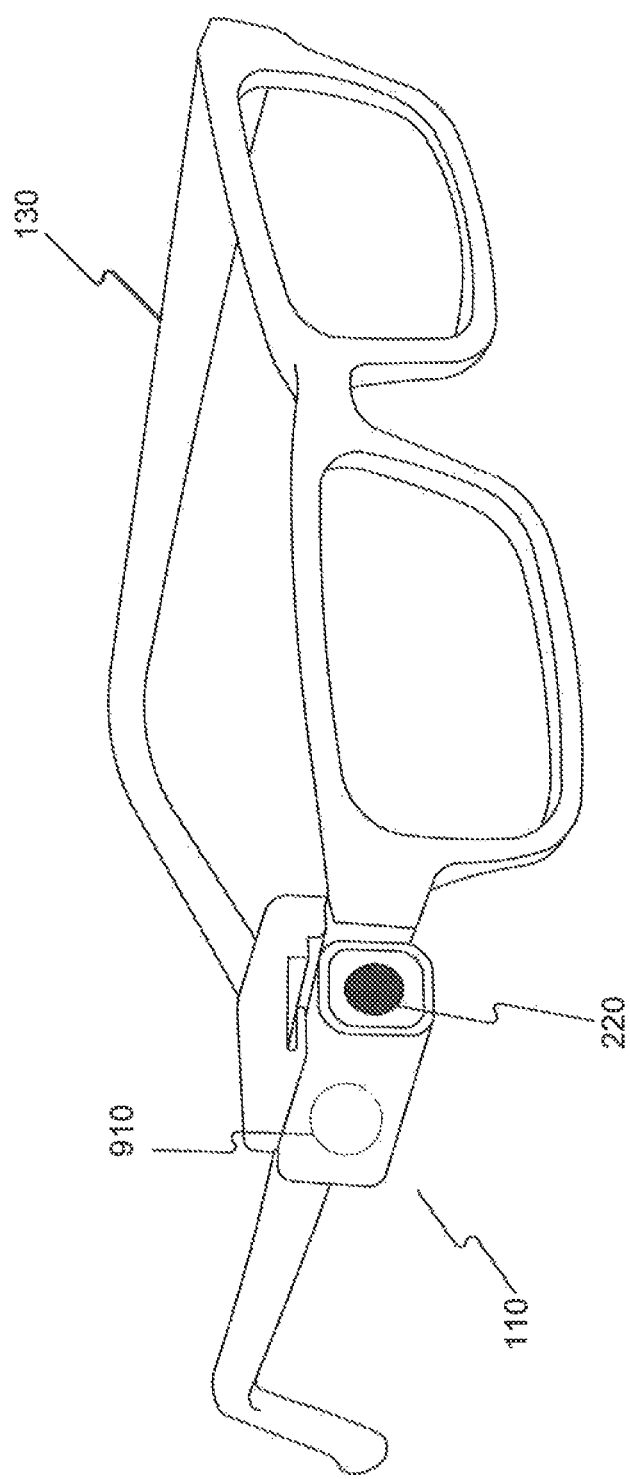
FIG. 9 illustrates an embodiment of a wearable apparatus including a microphone.

FIG. 8 illustrates a flowchart of an exemplary method for selectively storing data captured by a wearable apparatus. FIG. 9 illustrates a wearable apparatus 110 consistent with data storage method 800. Wearable apparatus 110, as illustrated in FIG. 9, includes a wearable image sensor 220 configured to capture a plurality of images from the environment of the user and a microphone 910 configured to capture audio data from the environment of the user. Wearable apparatus 110 may further include a buffer device for temporarily storing data, a memory device for storing data, and at least one processing device programmed to carry out instructions. A buffer device may be a memory storage device, and may include a small amount of easily accessible memory for temporary data storage. A memory device for storing data may permit the storage of more data than a buffer device. In some embodiments, the buffer device and the memory device may be accommodated on the same physical memory device. In some embodiments, they may be separate memory devices. As discussed above, aspects of the wearable apparatus may be included in a single unit, e.g., integrally with the glasses 130 as illustrated in FIG. 9. In other embodiments, the wearable apparatus may include multiple associated components, for example, a smart phone or tablet that communicates with other aspects of the wearable apparatus.

Selective data storage method 800 may proceed as follows. Data capture module 601 may receive data via wearable apparatus 110. Captured data may include at least one of image data captured via an image sensor of wearable apparatus 110 at step 801 and audio data received by a microphone of wearable apparatus 110 at step 802. Data capture module 601 may further store at least a portion of the audio and/or image data in a buffer device of wearable apparatus 110 at step 803.

Trigger identification module 602 may analyze the buffered data at step 804 to identify a trigger. A trigger may be included in the received audio data, and the trigger identification module 602 may be configured to process at least a portion of the audio data received by the microphone to identify the trigger. Such an audio trigger may include, for example, a word or series of words, a pattern of speech, and/or an external sound, such as a fire alarm. A pattern of speech may include, for example, voice recognition to identify a specific speaker. Thus, a user may speak a specific word or phrase to cause a trigger, or, for example, all speech by certain person may constitute a trigger. A trigger may be included in image data received from a wearable image sensor, and trigger identification module 602 may be configured to process a plurality of images to identify the trigger. Such image related triggers may include, for example, a hand gesture, the appearance of one or more specific objects in the plurality of images, a visual event, the appearance of one or more specific persons in the plurality of images, and the appearance of one or more specific faces in the plurality of images.

Trigger identification module 602 may identify at least a portion of the data stored in the buffer device that preceded the trigger at step 805. Microphone 910 and/or image sensor 220 may continuously capture data, which may be continuously stored in the buffer device. The storage capability of the buffer device may determine how much data is stored— for example, 1 minute, 5 minutes, or one hour of data. When trigger identification module 602 identifies a trigger during image analysis, it may next identify at least a portion of the data that is stored in a buffer device that preceded the trigger. Action execution module 603 may then take action based on the trigger by storing, in the memory device, the identified, or preceding, portion of data at step 806. It is not necessary that the portion of preceding data that is stored in step 806 be in the same format as the trigger. For example, preceding image data may be stored when the trigger is an audio trigger, and vice versa. In some embodiments, both preceding audio and preceding image data may be stored.

Action execution module 603 may also execute instructions to receive a second portion of additional data received after or during the trigger, at step 807, and store the additional data in a memory device, at step 808. The second portion of additional data may be associated in the memory device with the identified portion of preceding data. In some embodiments, additional data captured by in the form of images by image sensor 220 or audio by microphone 910 captured after the receipt of the trigger may be stored in a storage device as additional data.

In one example of a selective data storage method, a user may initiate data storage through a specific set of words that constitute a trigger. In some embodiments, the nature of the data recording and storage may be based on the trigger that is identified. For example, a user may say "record image data now." When this trigger is identified by the system, a portion of image data received prior to the triggering audio may be stored in a memory device along with additional image data received after the trigger. Data storage may be halted by the identification of another trigger, e.g. "stop recording," or by a predetermined length of recording. Instead of a voice command, a trigger may be a certain image or images identified in the image data, for example a specific person or face, a specific vehicle or sign, or a hand gesture executed by the user. A user may predefine the type of image or audio that constitutes a trigger.

In some embodiments, the size of the data portion preceding the trigger that is identified as well as the amount of data taking place after the trigger that is recorded may depend on the trigger that is received. A user may employ several different audio triggers to induce different behaviors. For example, a user may say "begin recording" to initiate recording and the system may record only a small portion of data received prior to the trigger. In another example, a user may say "store the last minute," which may trigger the system to transfer all data received in the previous minute from the buffer device to the memory storage device. In some embodiments, a user may execute hand gestures to be captured by the image sensor to serve as triggers.

Figure 10:
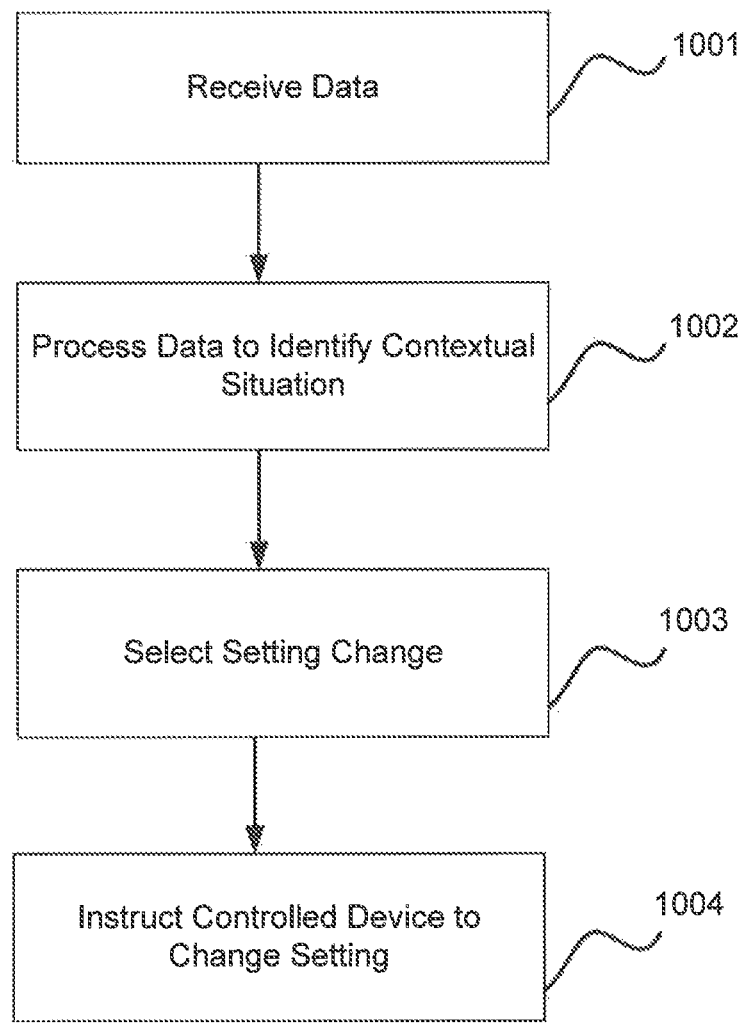
FIG. 10 is a flowchart illustrating an exemplary method consistent with the present disclosure.

In another embodiment consistent with the present disclosure, actions taken in response to a trigger identified from captured environmental data may include changes to settings of a user device. For example, certain contextual situations in an environment of a user may cause a device to enter a silent or quiet mode. FIG. 10 illustrates a flowchart of an exemplary device setting change method 1000. Embodiments of a wearable apparatus for causing a controlled device to change settings may include wearable image sensor 220 configured to capture a plurality of images from an environment of the user, a communications interface, and at least one processing device 210. A communications interface may include, for example, wireless transceiver 230. In some embodiments, a wearable apparatus consistent with method 1000 may further include a microphone.

An exemplary device setting change method 1000 may proceed as follows. Method 1000 may be executed by software instructions stored on memory 550 and executed by processor 210. Data capture module 601 may capture or received data at step 1001. Such data may be in the form of one or more images or video captured by a wearable image sensor. In some embodiments, captured data may be in the form of audio data. In some embodiments, captured data may include both audio and image/video data.

Trigger identification module 602 may then process the captured data at step 1002 to identify a contextual situation within the data. For example, trigger identification module 602 may process a plurality of images and/or audio data to identify a context associated with a location (e.g., a room) where the user is located. The context of the room may include what type of room it is or what type of behavior is expected in the room. Various features of image or audio data identified during step 1002 may assist to determine the context of a room. Although the following disclosure discusses identifying the context of a room, other locations are within the scope of the disclosure. For example, trigger identification module 602 may identify a context associated with other locations, including, for example, outdoor locations (e.g., a park, a street, a building exterior, etc.) and locations inside a vehicle.

The context of the room may be identified, for example, based on a number of chairs in the room. For example, a large number of chairs may assist to identify a room as a conference room or as an auditorium. The context of the room may be identified, for example, based on a size and/or shape of a table in the room. A large table, for instance, may identify a room as a conference or meeting room. The context of a room may be identified based on an identification of one or more items on the table in the room. For example, the presence of dishware and silverware may assist to identify a room as part of a restaurant or a dining room. In some embodiments, processing device 210 may be further configured to use a level of noise and/or light detected in the room to facilitate the identification of the context of the room. For example, the identification of a noisy or quiet room may indicate that quiet or noisy behavior is appropriate in the room. The identification of a very dark room may indicate a movie theater, for example. The context of a room may be identified based on a number of people in the room, the arrangement of the people, and/or the posture of the people. For example, a large number of seated people may indicate the context of a conference room. The context of a room may be identified based on the identification of a person speaking in the room. A user, for example, may identify a particular person's speech or image to trigger a device setting change. The context of a room may be identified based on one or more specific objects within the room, for example, a projector, water pitcher, lectern, and/or food tray may be indicators of a conference or meeting room. The foregoing list of potential context indicators is non-exclusive, and a person of skill in the art will recognize that the context of a room may be recognized or identified by additional or alternative characteristics identified within audio and/or image data captured by a wearable apparatus.

Further, the context of a room may be recognized or identified by considering multiple characteristics identified within audio and/or image data captured by a wearable apparatus. For example, in some embodiments, the context of a room may be determined based on the presence of a predetermined number (e.g., two, three, four, five, etc.) of characteristics in a room (e.g., the context of a room is a conference room if it includes three or more characteristics, such as a large number of people, a large table, and a projector). Room contexts may be predefined and/or user defined. Predefined room contexts may include common room situations, such as conference rooms, auditoriums, etc. In some embodiments, a user may define room contexts by capturing environmental image and/or audio data in a specific situation and tagging that data with a context identified. Processing device 210 may store such information in database 605 for later use in identifying a contextual situation within a room. For example, a user may capture data about the environment of a specific room in a workplace, such as a supervisor's office, and tag that data as such. Although the supervisor's office may not correspond to a predefined context, the user may define it as a specific context in order to permit the wearable apparatus to automatically take action upon detecting that the user has entered the supervisor's office.

Action execution module 603, may select, at step 1003, a setting change for a controlled device.

Controlled devices may include devices of the user of the wearable apparatus as well as other compatible devices. Processing device 210 may be configured to receive, via the communications interface, a signal from a controlled device, and to identify a person associated with the controlled device based on the signal. The associated person may be identified based on a device identifier in the signal. The associated person may include the user of the wearable apparatus or another person. Thus, a controlled device may include a device of the user that is associated with the wearable apparatus of the user. For example, the controlled device may be a smartphone or tablet identified by the wearable apparatus of the user via a wireless Bluetooth connection. As described above, processing device may identify the device based on a wireless signal of the device. This may allow, for example, a wearable apparatus 110 to control any device of a particular user, without requiring the user to specifically designate a device as the controlled device.

Device compatibility may also be determined via a received wireless signal. For example, processing device 210 may be configured to receive, via the communications interface, a signal from a controlled device, and to identify that the controlled device is compatible with the wearable apparatus via the signal. For example, the system may identify that the controlled device is wearable based on the signal. Identification may be accomplished, for example, based on a device identifier included in the signal. Thus, a controlled device may be determined to be compatible with the wearable apparatus based on the device identifier.

Returning now to FIG. 10, action execution module 603 may select a setting change for a controlled device at step 1003. The setting change may be based on the context associated with the room of the user. For example, upon entering a conference room or auditorium, the setting change may include switching the device to a silent mode or a vibrate mode. Upon identifying that a user has left a conference room, the device may be switched away from a silent mode. Upon entering a noisy room, the device ringer volume may be increased. Additional device setting changes may be apparent to a person of skill in the art.

Action execution module 603, at step 1004, may further cause transmission of an instruction to the controlled device, via the communications interface, to adopt the device setting change selected at step 1003. Thus, for example, processing device 210 may, based on the context associated with the room, cause transmission of an instruction to a controlled device via the communications interface, wherein the instruction includes instructing the controlled device to enter a silent mode.

An example of device setting change method 1000 may include the following scenarios. A user of a wearable apparatus may pick up a mobile device, such as a smartphone or tablet. Based on an identifier in a wireless signal of the device, the wearable apparatus may determine that it is a compatible device, owned by the user, and thus may treat it as a controlled device. As the wearable apparatus user goes about their day, the wearable apparatus may continually detect the context of rooms and locations that the user enters and exits, and may continually perform device setting adjustments based on the room contexts. When entering a meeting room at his or her office, the user's device may be switched to a silent mode. When exiting the meeting, the silent mode may be switched off. After the work day, the user's device volume may be increased and vibration may be enabled when the user enters a noisy restaurant after work.

The foregoing presents several exemplary embodiments of a wearable apparatus capable of performing actions based on triggers detected in an environment of the user. The details provided are non-exclusive and exemplary only, and additional actions and triggers may be apparent to those of skill in the art.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for storing information related to objects identified in an environment of a user, the wearable apparatus comprising:
    a wearable image sensor configured to capture a plurality of images from the environment of the user while being worn by the user;
    an attachment mechanism configured to enable the image sensor to be worn by the user; and
    at least one processor programmed to:
        receive image data representative of the plurality of images;
        analyze, using at least one automated image processing technique, the image data representative of one or more of the plurality of images to detect one or more of a plurality of predetermined triggers;
        detect, in the image data representative of at least one of the plurality of images, a trigger indicative of an object leaving a hand of the user;
        responsive to detecting the trigger indicative of the object leaving the hand of the user, detect, in the image data representative of at least one of the plurality of images, the object entering a receptacle;
        determine, based on the image data representative of at least one of the plurality of images that includes the receptacle, at least a type of the receptacle, the type of receptacle including at least one of a trash receptacle or a recycling receptacle;
        detect, in a portion of the image data representative of at least one of the plurality of images that includes the object, one or more characteristics of the object;
        determine, based on a comparison of the one or more characteristics in the portion of the image data with one or more images of representative objects stored in a database, at least a category for a type of the object;
        determine, based on a comparison of the one or more characteristics in the portion of the image data with one or more images stored in the database and associated with at least one sub-category within the category, an identity of the object;
        based on the identity of the object and on the type of the receptacle, generate information related to an action to be taken related to the object; and
        provide an instruction to a controlled device associated with the user based on the generated information.

2. The wearable apparatus of claim 1, wherein the type of the object includes at least one or more of a type of product, a brand of product, and a product name.

3. The wearable apparatus of claim 1, wherein the information related to the action includes an indication to purchase a replacement of the object.

4. The wearable apparatus of claim 3, wherein the instruction causes an update to an action item list to include the object.

5. A method for storing information related to objects identified in an environment of a user of a wearable apparatus, comprising:
    capturing a plurality of images from the environment of the user by a wearable image sensor while being worn by the user;
    receiving, via at least one processing device, image data representative of the plurality of images;
    analyzing, via the at least one processing device using at least one automated image processing technique, the image data representative of one or more of the plurality of images to detect one or more of a plurality of predetermined triggers;
    detecting, in the image data representative of at least one of the plurality of images, a trigger indicative of an object leaving a hand of the user;
    responsive to detecting the trigger indicative of the object leaving the hand of the user, detecting, via the at least one processing device, in the image data representative of at least one of the plurality of images, the object entering a receptacle;
    determining, based on the image data representative of at least one of the plurality of images that includes the receptacle, at least a type of the receptacle, the type of receptacle including at least one of a trash receptacle or a recycling receptacle;
    detecting, in a portion of the image data representative of at least one of the plurality of images that includes the object, one or more characteristics of the object;
    determining, via the at least one processing device, at least a category for a type of the object based on a comparison of the one or more characteristics in the portion of the image data with one or more images of representative objects stored in a database;

determining, based on a comparison of the one or more characteristics in the portion of the image data with one or more images stored in the database and associated with at least one sub-category within the category, an identity of the object;

generating, based on the identity of the object and on the type of the receptacle, information related to an action to be taken related to the object; and providing an instruction to a controlled device associated with the user based on the generated information.

6. The method of claim 5, wherein the type of the object includes at least one or more of a type of product, a brand of product, and a product name.

7. The method of claim 5, wherein the information related to the action includes an indication to purchase a replacement of the object.

8. The method of claim 7, wherein the instruction causes an update to an action item list to include the object.

9. A non-transitory computer readable medium storing instructions executable by at least one processing device, the instructions including instructions for:

capturing a plurality of images from the environment of a user by a wearable image sensor while being worn by the user;

receiving image data representative of the plurality of images;

analyzing, using at least one automated image processing technique, the image data representative of one or more of the plurality of images to detect one or more of a plurality of predetermined triggers;

detecting, in the image data representative of at least one of the plurality of images, a trigger indicative of an object leaving a hand of the user;

responsive to detecting the trigger indicative of the object leaving the hand of the user, detecting in the image data representative of at least one of the plurality of images, the object entering a receptacle;

determining, based on the image data representative of at least one of the plurality of images that includes the receptacle, at least a type of the receptacle, the type of receptacle including at least one of a trash receptacle or a recycling receptacle;

detecting, in a portion of the image data representative of at least one of the plurality of images that includes the object, one or more characteristics of the object;

determining at least a category for a type of the object based on a comparison of the one or more characteristics in the portion of the image data with one or more images of representative objects stored in a database;

determining, based on a comparison of the one or more characteristics in the portion of the image data with one or more images stored in the database and associated with at least one sub-category within the category, an identity of the object;

generating, based on the identity of the object and on the type of the receptacle, information related to an action to be taken related to the object; and providing an instruction to a controlled device associated with the user based on the generated information.

10. The non-transitory computer readable medium of claim 9, wherein the type of the object includes at least one or more of a type of product, a brand of product, and a product name.

11. The non-transitory computer readable medium of claim 9, the information related to the action includes an indication to purchase a replacement of the object.

12. The non-transitory computer readable medium of claim 11, wherein the instruction causes an update to an action item list to include the object.

\* \* \* \* \*